UNITED STATES PATENT OFFICE.

HAMILTON Y. CASTNER, OF NEW YORK, N. Y., ASSIGNOR OF FIVE-EIGHTHS TO JOHN H. BOOTH, OF SAME PLACE, AND HENRY BOOTH, OF POUGH-KEEPSIE, NEW YORK.

MANUFACTURE OF SODIUM AND POTASSIUM.

SPECIFICATION forming part of Letters Patent No. 342,897, dated June 1, 1886.

Application filed February 25, 1886. Serial No. 193,093. (Specimens.)

*To all whom it may concern:*

Be it known that I, HAMILTON Y. CASTNER, a citizen of the United States, and a resident of the city, county, and State of New York, have invented certain new and useful Improvements in the Manufacture of Sodium and Potassium, of which the following is a specification.

Heretofore sodium and potassium have been manufactured by intimately mixing the carbonates of the alkalies with a carbonaceous material and a certain proportion of lime or the sulphate or carbonate of lime, and submitting the mixture to an intense heat in iron cylinders or retorts, the alkali metal being thereby reduced and distilled, and then condensed in appropriate receivers. The addition of lime is necessary in this process to prevent the alkaline carbonate from fusing, and thereby separating from the carbon. By this mode of manufacture it has been found that to attain any practical result the carbon in the mixture must be largely in excess of the amount required theoretically to perform the reduction, owing to the fact that the mixture must be kept from fusing, to prevent the separation of the carbon and alkali. The excess of carbon is absolutely necessary to assure an extended contact between the particles of carbon and alkali while being heated. The effect of this excess of carbon is to produce in the gas resulting from the reduction a large proportion of carbonic oxide, which combines with the alkaline metal, forming a carbide or a carboxide, from which the metal cannot be separated by distillation. The lime necessarily added forms, with the soda or potassa, compounds (known, respectively, as "soda-lime" and "potash-lime") from which carbon will not reduce the alkaline metal. The required heat to perform the reduction and distill the metal by this process is very high, consequently the iron retorts are soon rendered worthless.

The amount of sodium produced by the above-described manufacturing operation at the present time, owing to the causes enumerated, rarely exceeds one-third of the amount contained in the charge, and with potassium much less is obtained. A certain process is also mentioned in scientific works, whereby the alkaline metals are produced by decomposing the hydrates of the alkali with iron filings at a white heat. This process has never received practical application, chiefly owing to the intense heat necessary to perform the reaction, and also to the fact that oxide of iron produced when the reaction has partially taken place combines with the alkali, forming ferrate of soda or potassium.

The object of my invention is to decompose either the carbonate or the hydrate of an alkali when in a state of fusion, without employing an excess of carbon, and thereby obtain a large yield of metal with but little waste. To accomplish this result, I fuse a mixture of the alkali and the carbide of a metal or its equivalent in a fine state of division, as is hereinafter described. By the equivalent of a carbide I mean a mixture of carbon and a metal finely ground or in a fine state, held together by mechanical means, and from which the metal cannot be separated, excepting by the aid of acids, and which is of such weight that it will not separate from the alkali in the process of the manufacture of the potassium or sodium.

Regarding the actual compounds known as "carbides" very few have been prepared, the most common one, however, is made by calcining anhydrous ferro-cyanide of potassium in the absence of air, the following reaction taking place, viz: $K_4FeC_6N_6 + Heat = 4KCN + FeC_2 + N_2$, potassium ferro-cyanide producing potassium cyanide, carbide of iron, and nitrogen. The carbide is separated from the cyanide by treating the mass with water, the carbide being insoluble.

In place of using an actual chemical compound of this kind, I prefer to prepare one of the following substitutes, which fully answers the purposes of a carbide. Any easily-reducible metal or its oxide in a fine state of division is well mixed with a hydrocarbon—such as tar, bituminous coal, &c.—preference being given to the hydrocarbon containing the least amount of mineral matter, and the mixture is charred or coked without access of air. The result, after so heating, will be a hard heavy mass of "metallic coke" containing the metal in a minute form intimately mixed with the carbon from the hydrocarbon. I prefer to use either metallic iron, previously reduced in a fine state, or the sesquioxide of iron combined with the hydrocarbon, owing to their low value, but do not confine myself to the use of iron alone combined with the carbon, as other metals will answer fully as well.

In producing this so-called "carbide of iron" I use such proportions of hydrocarbon and metallic iron or iron sesquioxide as will give, after heating, a coke containing thirty per cent. of carbon and seventy per cent. of of iron. This corresponds in composition to the known compound of carbon and iron—$Fe C_2$. I do not confine my claims to this relative proportion of carbon and iron. This metallic or metallized coke, prepared as described, is finely ground, and is then ready for use with the carbonated or hydrated alkali, as is hereinafter described. The "carbide" is mixed with alkali in proportions which may be readily calculated from the reactions hereinafter described, and the mixture is submitted to a bright red heat in iron crucibles connected with the usual condenser for sodium or potassium. When the mixture in the crucible reaches the proper temperature, fusion takes place and the reduction immediately commences, sodium or potassium being distilled from the crucible to the condenser. I prefer using the hydrated alkali for the production of the metal, owing to its being more fusible than the carbonate, but do not confine my claims to the use of the hydrates only. The reactions which take place vary with the proportions of alkali and carbide, of which the following is a description:

$4NaHO + FeC_2 = Na_2CO_3 + Fe + H_4 + CO + Na_2$. This reaction takes place when using ten pounds of dry caustic soda and five pounds of carbide, equivalent to one and a half pound of carbon. As a result, two and seven-eighths pounds of sodium are produced, or one-half of that contained in the charge or mixture.

$2NaHO + FeC_2 = NaCO + Fe + H_2 + Na + CO$. This reaction takes place when using ten pounds of dry caustic soda and ten pounds of carbide, equivalent to three pounds of carbon. As a result, two and seven-eighths of sodium are produced, or one-half of that contained in the charge. The excess of carbon combines with the soda and part of the sodium to form carboxide. By the term "carboxide" in this reaction I mean a mixture of metallic sodium, carbon, carboxide of sodium, sodium dioxide, and carbonate of soda, which, by analysis, would show the carbon, sodium, and oxygen to be present in the mixture in the proportion to form carboxide of sodium.

The following reaction is deduced from the two previous ones, and can be made to take place by combining these two reactions or using twenty pounds dry caustic soda and fifteen pounds of carbide, equivalent to four and a half pounds of carbon. When this is done and the mixture heated, both the previous reactions take place, producing the same result; but by carrying on the reaction the carboxide of sodium reacts with the carbonate of soda, producing metallic sodium and carbon dioxide as follows: $Na_2CO_3 + NaCO = Na_3 + CO_2$. Thus the reaction actually taking place when ten pounds of dry caustic soda are fused with seven and one-half pounds of carbide, equivalent to two and one-fourth pounds of carbon, is as follows: $3NaHO + FeC_2 = 3Na + Fe + 3H + CO + Co_2$. It will be seen from this that all the sodium of the caustic soda is liberated in an atmosphere composed of hydrogen, carbonic oxide, and carbon dioxide, which has no effect upon sodium when in a vaporized state. The metallic iron of the carbide also possibly exerts an influence upon the oxygen of the alkali, and would thus account for the lower temperature at which the reaction takes place between the carbon and the oxygen of the alkali. Previous to my use of a metallic carbide these reactions could not be performed, as the caustic alkali would fuse and separate from the carbon, and when the reaction was tried without fusion, as before described, lime had to be added, which prevented a perfect reaction, and also prevented the alkali from coming in direct contact with the necessary amount of carbon, so that all the alkali could be reduced and liberated. By the use, however, of a metallic carbide, or its equivalent, as described, to perform the reduction, the alkali may be fused while the carbon is held in suspension throughout the fused mass in a most minute and active form, thereby being in intimate contact with all particles of the alkali, and accomplishing a result hitherto deemed impossible. The reactions when the carbonate of soda is used are somewhat similar to those already described, and will be apparent to any one skilled in the art. In making potassium the reactions are the same as in the use of caustic or carbonate of soda, the only difference being in the relative weights of alkali and carbide. I have sometimes used a stream of carbon dioxide (dry) passed through the crucible in which the reduction takes place, and although it assists in removing and protecting the sodium vapors it is not indispensable to the success of the process. After the mixture of alkali and carbide has been submitted to heat and the metal reduced and distilled there remains in the crucible all the iron in a finely-divided metallic state, together with a small amount of carbon and carbonate of soda, which depends upon the relative proportion of alkali and carbide used. The least amount of soda remains when the proportions of caustic soda and carbide are as ten is to seven and a half. The crucibles containing the residues after the treatment are placed in warm water, the carbonate of soda dissolving, leaving the iron ready, when collected and dried, to mix with the hydrocarbon and produce the carbide. The solution of carbonate of soda is treated in the usual manner for producing caustic soda. By this method the yield of alkali metal closely approaches the theoretical amount contained in the charge, the heat necessary for the reduction is not so high as heretofore required, and the accomplishment of the result requires less skillful management.

I do not here claim the mode of making a heavy carbon compound, nor said compound as an article of manufacture, as this will form the subject of a separate application for Letters Patent.

In referring to the combination of carbon and metal as the equivalent of a carbide, no actual chemical combination is inferred, but a mechanical combination.

What I claim as new in my process, and desire to secure by Letters Patent, is—

1. In a process for manufacturing sodium or potassium, performing the reduction by diffusing carbon in a body of alkali in a state of fusion at moderate temperatures, substantially as described.

2. In a process of manufacturing sodium or potassium, performing the reduction by means of the carbide of a metal or its equivalent, substantially as set forth.

3. In the process of manufacturing sodium or potassium, mechanically combining a metal and carbon to increase the weight of the reducing material, and then mixing this product with the alkali and fusing the latter, whereby the reducing material is held in suspension throughout the mass of fused alkali, substantially as described.

4. In the process of reduction, performing the deoxidization by the carbide of a metal or its equivalent, substantially as described.

In testimony whereof I have signed my name to this specification in the presence of two subscribing witnesses.

HAMILTON Y. CASTNER.

Witnesses:
C. E. FOSTER,
F. L. FREEMAN.